(12) United States Patent
Moriya et al.

(10) Patent No.: US 8,912,737 B2
(45) Date of Patent: Dec. 16, 2014

(54) LINEAR ACTUATOR DRIVING DEVICE

(75) Inventors: Hideaki Moriya, Mie (JP); Takenori Motoori, Mie (JP); Takeo Ito, Mie (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 214 days.

(21) Appl. No.: 13/808,041

(22) PCT Filed: Jul. 1, 2011

(86) PCT No.: PCT/JP2011/065217
§ 371 (c)(1),
(2), (4) Date: Jan. 2, 2013

(87) PCT Pub. No.: WO2012/002544
PCT Pub. Date: Jan. 5, 2012

(65) Prior Publication Data
US 2013/0106319 A1 May 2, 2013

(30) Foreign Application Priority Data

Jul. 2, 2010 (JP) ................................ 2010-152431

(51) Int. Cl.
| | | |
|---|---|---|
| H02K 33/00 | (2006.01) | |
| H02P 25/02 | (2006.01) | |
| B60N 2/02 | (2006.01) | |
| H02P 21/00 | (2006.01) | |
| H02P 21/05 | (2006.01) | |
| F16F 7/10 | (2006.01) | |

(52) U.S. Cl.
CPC ............ *H02P 25/027* (2013.01); *B60N 2/0244* (2013.01); *H02P 21/0035* (2013.01); *H02P 21/05* (2013.01); *F16F 7/1011* (2013.01)
USPC ........... 318/128; 318/460; 318/687; 318/135; 318/686; 318/130

(58) Field of Classification Search
USPC .................. 318/128, 460, 687, 135, 686, 130
See application file for complete search history.

(56) References Cited

U.S. PATENT DOCUMENTS 6,538,402 B2 *  3/2003  Gokturk et al. ............... 318/128
6,560,129 B1 *  5/2003  Walger ........................... 363/50

(Continued)

FOREIGN PATENT DOCUMENTS

| | | |
|---|---|---|
| JP | 59-001833 A | 1/1984 |
| JP | 05-173646 A | 7/1993 |

(Continued)

OTHER PUBLICATIONS

International Search Report of PCT/JP2011/065217, mailing date of Nov. 29, 2011.

*Primary Examiner* — Rita Leykin
(74) *Attorney, Agent, or Firm* — Westerman, Hattori, Daniels & Adrian, LLP

(57) ABSTRACT

A linear actuator driving device is provided. The linear actuator driving device includes an electromagnetic driving unit which makes a moving element reciprocate in response to a driving command and an offset correcting unit which corrects the driving command to carry out offset energization to make the center of reciprocation of the moving element be moved in the direction in which deviation between the center of reciprocation of the moving element and the center of the movement possible range is eliminated. The offset correcting unit is configured such that the amplitude information is acquired and, with respect to the amplitude value corresponding to the acquired amplitude information, if the movable amplitude is in a movable area insufficient condition, correction of the driving command is performed and, on the other hand, if the movable amplitude is not in the movable area insufficient condition, correction of the driving command is released.

18 Claims, 7 Drawing Sheets

(56) References Cited

U.S. PATENT DOCUMENTS

| | | | |
|---|---|---|---|
| 6,874,644 B1 * | 4/2005 | Wagener et al. | 210/513 |
| 7,974,769 B2 * | 7/2011 | Shin | 701/111 |
| 8,401,735 B2 * | 3/2013 | Muragishi et al. | 701/37 |
| 8,560,129 B2 * | 10/2013 | Moriya et al. | 700/280 |
| 2005/0228574 A1 * | 10/2005 | Ichikawa et al. | 701/111 |
| 2005/0248070 A1 * | 11/2005 | Ichikawa et al. | 267/136 |
| 2006/0287788 A1 * | 12/2006 | Ichikawa et al. | 701/36 |
| 2010/0127442 A1 | 5/2010 | Muragishi et al. | |

FOREIGN PATENT DOCUMENTS

| | | |
|---|---|---|
| JP | 2006-014464 A | 1/2006 |
| JP | 2008-256109 A | 10/2008 |
| JP | 2008-256110 A | 10/2008 |

\* cited by examiner (a) NOT IN MOVABLE AREA INSUFFICIENT CONDITION AT FREQUENCY $f_0$ (b) IN MOVABLE AREA INSUFFICIENT CONDITION AT FREQUENCY $f_1$

⬇ OFFSET ENERGIZATION

LINEAR ACTUATOR DRIVING DEVICE

TECHNICAL FIELD

The present invention relates to a driving device of a linear actuator in which a moving element is made to reciprocate. More particularly, the present invention relates to a driving device of a linear actuator in which offset displacement of the driving element is properly corrected if offset displacement of the moving element has occurred due to self weight and a movable range thereof has become narrower than its original movable range.

BACKGROUND ART

A linear actuator driving device, such as a reciprocal motor, is a device also called "driver" which causes a moving element to reciprocate electrically by carrying out energization in response to a driving command. Regarding the linear actuator, such as a reciprocal motor, there is a case in which, in a non-energized state, the center of reciprocation of the moving element is displaced from the center of a predetermined movement possible range due to self weight and, therefore, the movable range becomes narrower than the original movement possible range. In this case, there is a problem that, in order to avoid collision with, for example, an unillustrated casing which houses the moving element and the stator, it is not possible to cause the moving element to reciprocate with amplitude that requires a range wider than the narrowed movable range.

As a means for solving this problem, Patent Document 1 discloses a device for electrically correcting offset displacement of a movable element by constantly carrying out offset energization: the disclosed device includes an offset correcting unit which corrects a driving command such that offset energization is carried out to cause the center of reciprocation of the moving element to move in a direction in which deviation between the center of reciprocation of the moving element and the center of a movement possible range is eliminated.

As another means for solving the above-described problem, Patent Documents 2 and 3 disclose devices for mechanically correcting offset displacement: in the disclosed devices, arrangement positions of permanent magnets are determined or strength of each permanent magnet is varied such that deviation is caused in magnetic fluxes of the permanent magnets in a non-energized state.

PRIOR ART DOCUMENTS

Patent Documents

Patent Document 1: Japanese Patent Application Laid-open No. 2008-256109
Patent Document 2: Japanese Patent Application Laid-open No. 2008-256110
Patent Document 3: Japanese Patent Application Laid-open No. 2006-14464

SUMMARY OF THE INVENTION

Problems to be Solved by the Invention

However, in such a related art linear actuator driving device which electrically corrects the offset displacement of the moving element as disclosed in Patent Document 1, there is a problem that, since the offset energization is carried out constantly, electrical power is consumed constantly and power efficiency is impaired.

In such a related art linear actuator driving device which mechanically corrects the offset displacement of the moving element as disclosed in Patent Documents 2 and 3, there is a problem that, since deviation in magnetic fluxes may decrease thrust which is obtained when energized at some areas, it is necessary, for obtaining desired thrust, to increase the size of the actuator or increase the amount of energization compared with an actuator that performs offset correction electrically.

The present invention is made in view of these problems, and an object thereof is to provide a novel linear actuator driving device which has achieved power saving in correcting offset displacement produced due to self weight of the moving element without any increase in device size and with reduced power consumption.

Means for Solving the Problem

The following measure has been devised as the present invention in order to solve the above-described problems.

That is, a linear actuator driving device of the present invention includes: an electromagnetic driving unit which makes a moving element reciprocate by carrying out energization in response to a driving command and; an offset correcting unit which corrects the driving command to carry out offset energization to make the center of reciprocation of the moving element be moved in the direction in which deviation between the center of reciprocation of the moving element and the center of a movement possible range is eliminated in a case in which, in a non-energized state, the moving element is displaced from the center of the predetermined movement possible range due to self weight and, therefore, the movable range is narrower than the movement possible range, wherein the offset correcting unit acquires amplitude information corresponding to an amplitude value of the moving element required for the reciprocation in response to the driving command and, if a movable amplitude with respect to an amplitude value corresponding to the acquired amplitude information is in a movable area insufficient condition, performs correction of the driving command and, on the other hand, if the movable amplitude is not in the movable area insufficient condition, releases correction of the driving command.

The movable area insufficient condition includes not only a condition that the movable amplitude is insufficient for the amplitude value of the moving element necessary for the reciprocation in response to the driving command, but also a condition that a predetermined margin is not included even if the movable amplitude is sufficient for the amplitude value of the moving element necessary for the reciprocation in response to the driving command. The movable amplitude is half the length of the movable range.

As described above, the amplitude information corresponding to an amplitude value of the moving element required for reciprocation in response to the driving command is acquired and, with respect to the amplitude value corresponding to the acquired amplitude information, if movable amplitude is in a movable area insufficient condition, correction of the driving command is performed and offset energization is carried out and, on the other hand, if the movable amplitude is not in the movable area insufficient condition, correction of the driving command is released and offset energization is stopped. It is therefore possible to reduce offset energization compared with a case in which offset energization is carried out constantly irrespective of whether the movable amplitude is in the movable area insufficient condition as in the related art, to achieve power saving, and to improve power efficiency. Further, since the offset displacement is corrected electrically by offset energization, the device size is not increased although those devices in which offset displacement is corrected mechanically are increased in size.

In order to acquire an amplitude value of the moving element on the basis of a single parameter and simplify the device, it is desirable that the offset correcting unit is configured to acquire frequency related to reciprocation of the moving element as amplitude information and acquire an amplitude value of the moving element from the acquired frequency and the maximum value which the driving command can take under the frequency.

In order to carry out highly accurate offset energization, it is desirable that the offset correcting unit is configured to acquire frequency and the driving command related to reciprocation of the moving element as the amplitude information and acquire the amplitude value of the moving element from the acquired frequency and a value of the driving command.

In order to pursue further power saving, it is effective that the offset correcting unit corrects the driving command such that the center of reciprocation of the moving element is moved by insufficient distance of movable amplitude which is determined from an amplitude value corresponding to the amplitude information, a previously set movement possible range and from an amount of offset displacement.

In order to secure the movable range reliably with a simple configuration without requiring complicated calculations, it is effective that the offset correcting unit corrects the driving command such that the center of reciprocation of the movable element is moved by certain distance.

In order to implement the offset correcting unit with a simple configuration, it is desirable that the offset correcting unit previously stores correction information in which a correction amount by which the center of reciprocation of the moving element is moved by the offset energization and the amplitude information are correlated with each other and corrects the driving command using the correction amount correlated with the amplitude information in the correction information.

Effect of the Invention

In the present invention, as described above, since amplitude information corresponding to the amplitude value of the moving element required for the reciprocation in response to the driving command is acquired and, if the movable amplitude of the moving element with respect to an amplitude value corresponding to the amplitude information is in the movable area insufficient condition, the driving command is corrected and offset energization is carried out such that the center of reciprocation of the moving element is moved in the direction in which deviation between the center of reciprocation of the moving element and the center of the movement possible range is eliminated and, on the other hand, if the movable amplitude is not in the movable area insufficient condition, correction of the driving command is released and offset energization is stopped, it is possible to reduce offset energization compared with the case in which offset energization is carried out constantly irrespective of whether the movable amplitude is not in the movable area insufficient condition as in the related art, to achieve power saving, and to improve power efficiency. Further, since the offset displacement of the moving element is corrected electrically, the device size is not increased although those devices in which offset displacement is corrected mechanically are increased in size. It is therefore possible to provide a linear actuator driving device suitable for reduction in size and suitable for power saving.

MODE FOR CARRYING OUT THE INVENTION

Hereinafter, a linear actuator driving device according to one embodiment of the present invention will be described with reference to the drawings.

Figure 1:
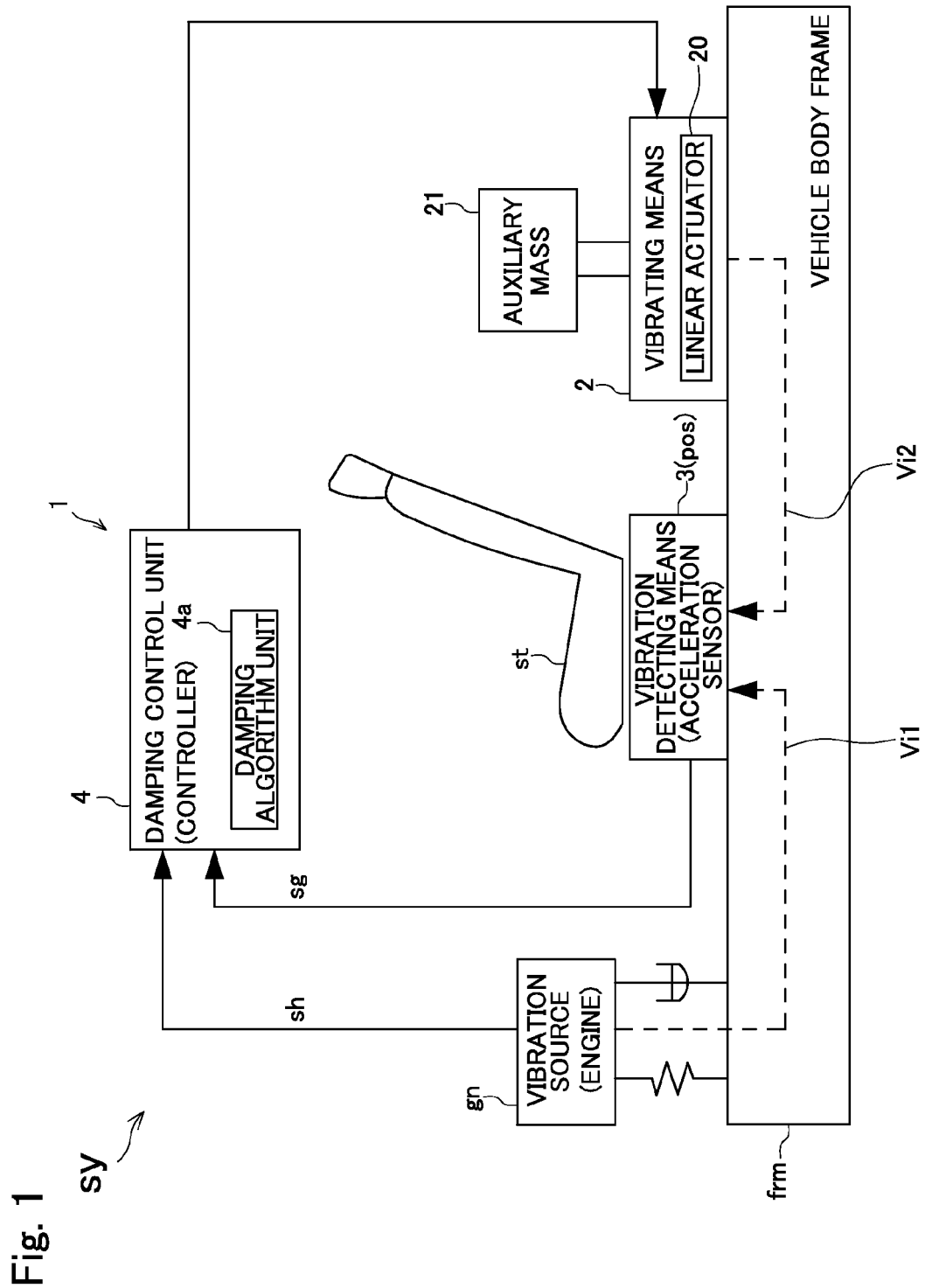
FIG. 1 is a configuration diagram schematically illustrating a configuration of a damping system to which a linear actuator driving device according to an embodiment of the present invention is applied.
Figure 2:
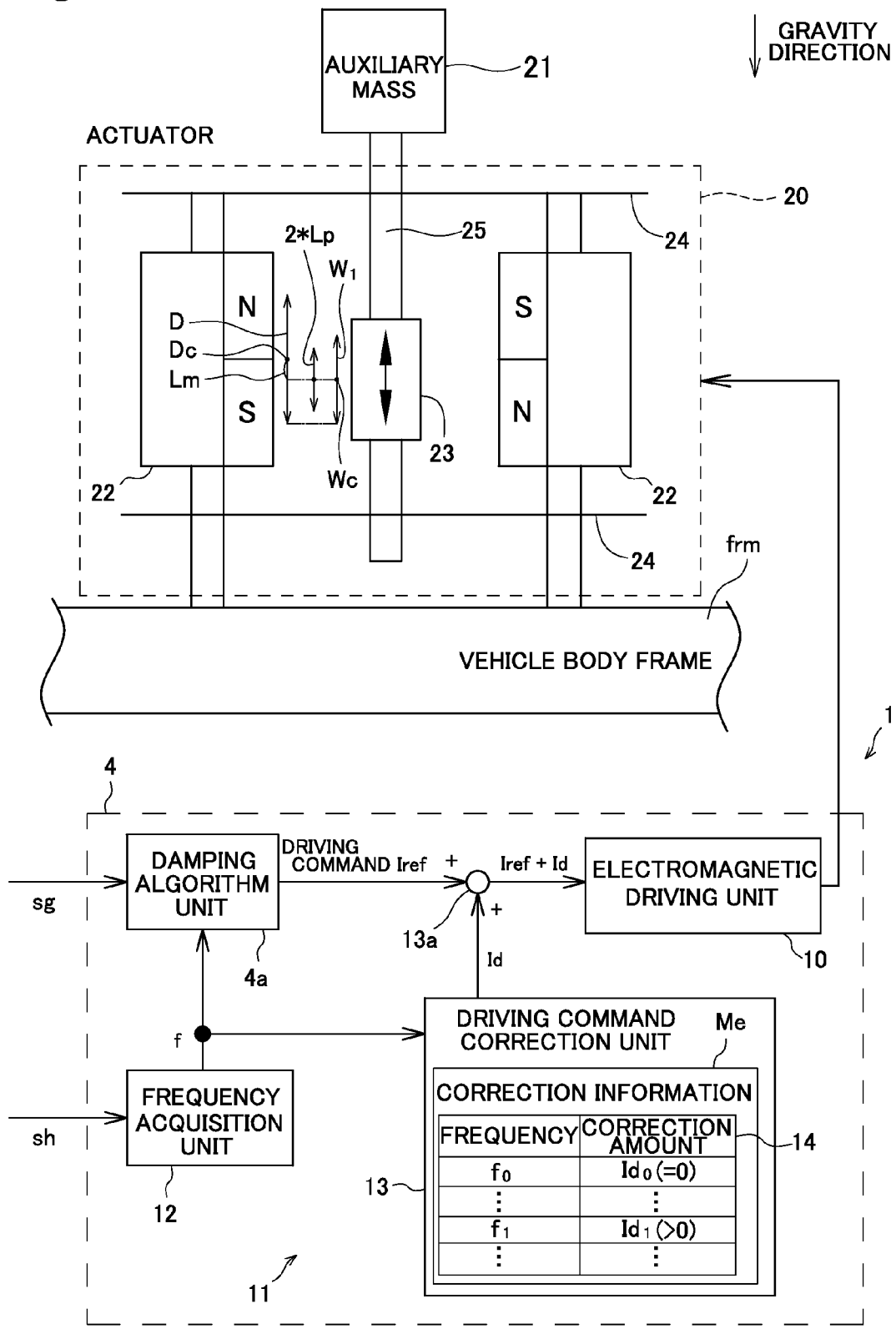
FIG. 2 is a configuration diagram schematically illustrating a configuration and a function of the linear actuator driving device according to the present embodiment.

The linear actuator driving device 1 is, as illustrated in FIGS. 1 and 2, a device which is applied to a damping system sy which reduces vibration at a position pos at which damping should be performed by causing vibration Vi1 generated in a vibration source gn and cancelling vibration Vi2 which is to be generated, via a vibrating means 2, at a position pos at which damping should be performed to be cancelled at a position pos at which damping should be performed, and which makes a moving element 23 of a linear actuator 20 used as the vibrating means 2 reciprocate.

The damping system sy to which the linear actuator driving device 1 of the present embodiment is applied, as illustrated in FIG. 1, is mounted on a vehicle, such as a car. The damping system sy includes a vibration detecting unit 3, such as an acceleration sensor, provided at the position pos at which damping should be performed, such as a seat st, and a control unit 4 (also referred to as "controller") which performs damping control to make the vibrating means 2 generate appropriate canceling vibration Vi2 such that vibration detected by the vibration detecting unit 3 is small. The control unit 4 includes, as a main component, a damping algorithm unit 4a which inputs an ignition pulse signal sh of an engine which is the vibration source gn and a detection signal sg from the vibration detecting unit 3 and generates a driving command which is a command to instruct the vibrating means 2 to generate the cancelling vibration Vi2 on the basis of these signals sh and sg.

As illustrated in FIG. 2, the linear actuator driving device 1 includes, as a main component, an electromagnetic driving unit 10 which makes the moving element 23 of the linear actuator 20 reciprocate by inputting a driving command Iref which is generated by the damping algorithm unit 4a, and making energization in accordance with the driving command Iref be applied to a coil (not illustrated) which constitutes the linear actuator 20. The linear actuator driving device 1 is provided in the control unit 4 (i.e., the controller). Since a specific configuration and explanation of operation of the electromagnetic driving unit 10 itself have been publicly known, as disclosed in, for example, Patent Document 1, detailed description thereof will be omitted.

The linear actuator 20 to be driven is, as illustrated in FIG. 2, an inner reciprocating type linear actuator in which a stator 22 provided with permanent magnets is fixed to a vehicle body frame form and the moving element 23 is made to reciprocate (i.e., perform an up-and-down movement on the page of FIG. 2) in the same direction as the direction of the vibration in which damping should be performed. Here, the linear actuator 20 is fixed to the vehicle body frame form such that the direction of the vibration, in which damping should be performed, of the vehicle body frame form and the reciprocating direction (i.e., the thrust direction) of the moving element 23 coincide with each other. The moving element 23 is attached to an axis 25 together with auxiliary mass 21. The axis 25 is supported by the stator 22 via a flat spring 24 so that the moving element 23 and the auxiliary mass 21 are movable in the thrust direction. A dynamic vibration absorber is thus constituted by the linear actuator 20 and the auxiliary mass 21.

If an alternating current (i.e., an sinusoidal current, a square wave current) is applied to the coil (not illustrated) which constitutes the linear actuator 20, in a condition in which a current in a predetermined direction is applied to the coil, magnetic fluxes are guided from S poles to N poles of the permanent magnets and thus a magnetic flux loop is formed. Therefore, the moving element 23 is moved in a direction opposing the gravity (i.e., upward). On the other hand, if a current in a direction opposite to the predetermined direction is applied to the coil, the moving element 23 is moved in the gravity direction (i.e., downward). The moving element 23 repeats the above-described movement as the direction of the current flow of the alternating current in the coil is changed alternately and reciprocates in the axial direction of the axis 25 with respect to the stator 22. Therefore, the auxiliary mass 21 attached to the axis 25 vibrates in the up-down direction. Since a specific configuration and explanation of operation of the linear actuator 20 itself have been publicly known, as disclosed in, for example, Patent Document 1, detailed description thereof will be omitted.

Figure 3:
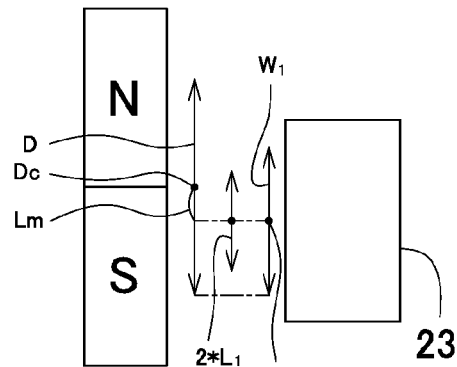
FIG. 3 is an explanatory view related to an operation of the driving device.
Figure 3:
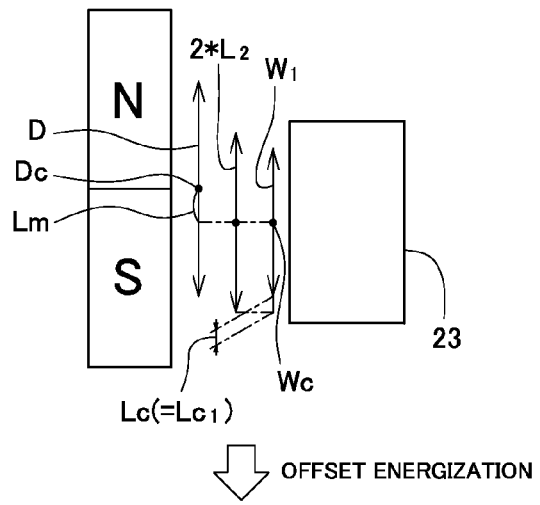
Figure 3:
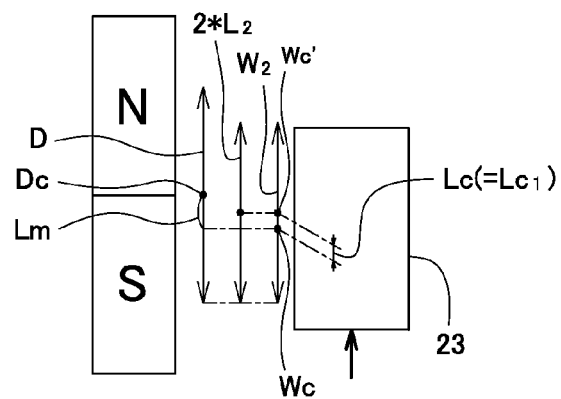

As illustrated in FIG. 2, a predetermined movement possible range D of the moving element 23 is defined by a stopper, not illustrated, which regulates an operating range. In a condition in which the center Dc of the movement possible range D and the center of reciprocation Wc of the moving element 23 coincide with each other, the movable range of the moving element 23 is the maximum. However, there is a case in which, as illustrated in FIG. 2, in a condition that the coil which constitutes the actuator 20 is not energized, the center of reciprocation Wc of the moving element 23 is displaced from the center Dc of the movement possible range D due to self weight by a distance Lm in the gravity direction and, therefore, a movable range $W_1$ required for making the actuator 20 reciprocate in a movable amplitude ($W_1/2$) may be narrower than the original movement possible range D ($W_1 = D - 2 \times Lm$). In this case, as illustrated in FIG. 3(*b*), there is a problem that it is not possible to cause the moving element 23 to reciprocate with an amplitude $L_2$ which is a range ($2 \times L_2$) wider than the narrowed movable range $W_1$ ($W_1 < 2L_2$).

Then, in order to solve this problem, the present embodiment further includes, as illustrated in FIG. 2, an offset correcting unit 11 which corrects the driving command Iref to carry out offset energization to make the center of reciprocation Wc of the moving element 23 be moved in the direction in which deviation between the center of reciprocation Wc of the moving element 23 and the center Dc of the movement possible range D is eliminated. However, if correction of the driving command Iref by the offset correcting unit 11 is performed constantly, electrical power is consumed constantly and power efficiency is impaired. Then, the offset correcting unit 11 is configured such that amplitude information corresponding to an amplitude value Lp of the moving element 23 required for reciprocation in response to the driving command Iref is acquired and, with respect to the amplitude value Lp corresponding to the acquired amplitude information, if the movable amplitude ($W_1/2$) is in a movable area insufficient condition, correction of the driving command Iref is performed and, on the other hand, if the movable amplitude is not in the movable area insufficient condition, correction of the driving command Iref is released.

As a specific configuration, as illustrated in FIG. 2, the offset correcting unit 11 is configured to include a frequency acquisition unit 12 and a driving command correction unit 13.

The frequency acquisition unit 12 acquires, as amplitude information, frequency f applied to the reciprocation of the moving element 23. The amplitude information is information which corresponds to the amplitude value Lp of the moving element 23 required for the reciprocation in response to the driving command Iref. For example, the amplitude information is the information representing the amplitude value Lp of the moving element 23 itself or an element which is a base for the acquisition of the amplitude value Lp of the moving element 23. Examples of the element which is the base for the acquisition of the amplitude value Lp of the moving element 23 are the frequency f related to the reciprocation of the moving element 23 and the value of the driving command Iref. This is because the amplitude value Lp of the moving element 23 can be determined (i.e., calculated) on the basis of two parameters of the frequency f related to the value of the driving command Iref and the reciprocation of the moving element 23. In the present embodiment, as illustrated in FIGS. 1 and 2, using the coincidence between the frequency of the vibration Vi2 generated in the reciprocation of the moving element 23 and the frequency of the vibration Vi1 generated in the vibration source gn, the frequency of the vibration Vi1 generated in the vibration source gn on the basis of the ignition pulse signal sh of the engine which is the vibration source gn is detected and the detected frequency is handled as the frequency f related to the reciprocation of the moving element 23.

The driving command correction unit 13 previously stores, in memory Me, correction information 14 in which the correction amount Id by which the center of reciprocation Wc of the moving element 23 is moved by offset energization and the frequency f which is the amplitude information are correlated with each other. The driving command correction unit 13 corrects the driving command Iref using the correction amount Id correlated with the frequency f acquired by the frequency acquisition unit 12 from among the correction information 14. In particular, the driving command correction unit 13 acquires a corresponding correction amount Id from among the correction information 14 with the frequency f acquired in the frequency acquisition unit 12 as a key and adds the correction amount Id to the driving command Iref in an adder 13*a*. In this manner, the driving command correction unit 13 corrects the driving command Iref to carry out offset energization to make the center of reciprocation Wc of the moving element 23 be moved in the direction in which deviation between the center of reciprocation Wc of the moving element 23 and the center Dc of the movement possible range D is eliminated. Although examples of the correction amount Id are the distance itself by which the center of reciprocation Wc of the moving element 23 is moved and a current value as an amount for correcting the driving command, the correction amount Id is handled as the current value for correcting the driving command in the present embodiment.

Figure 4:
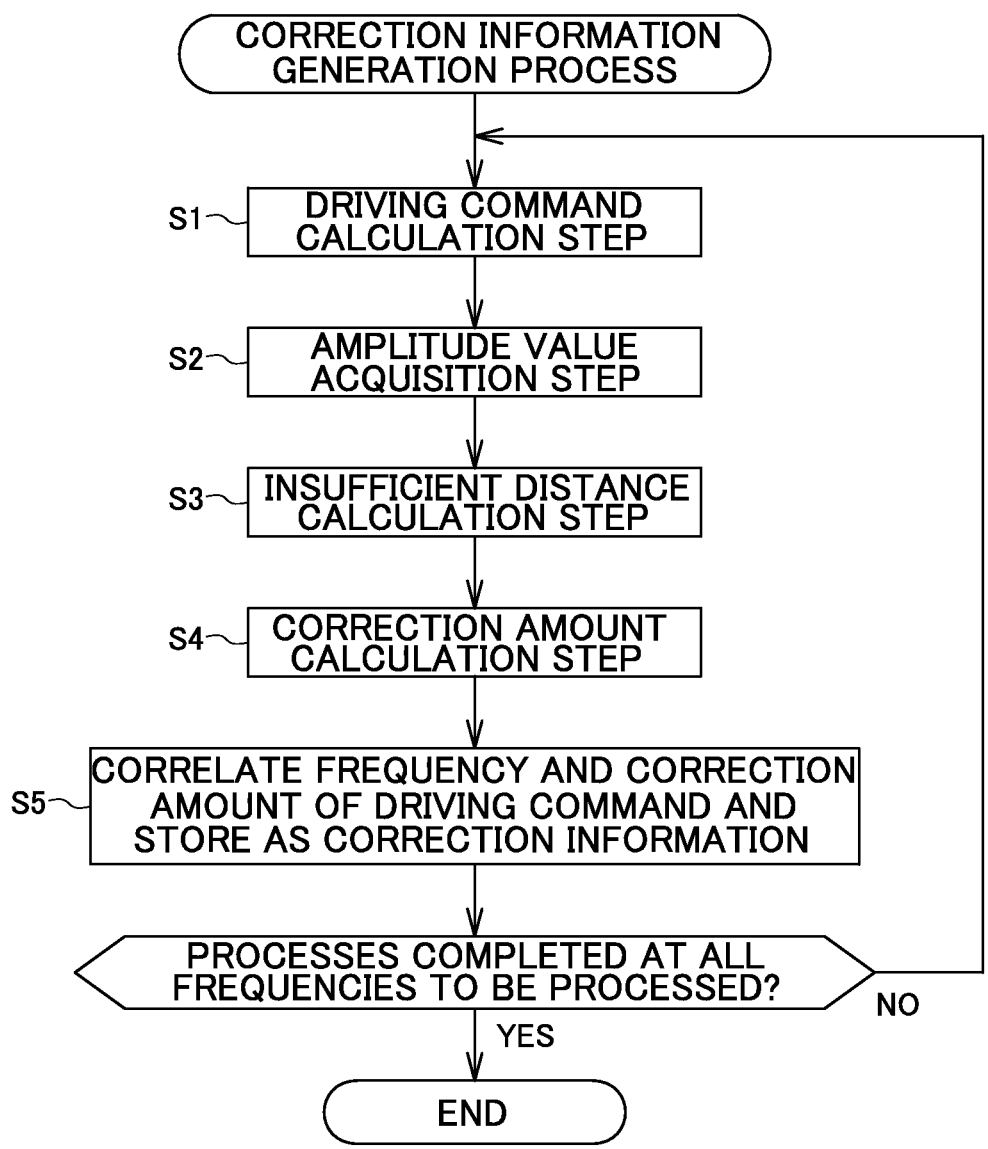
FIG. 4 is a flowchart illustrating a generation procedure of correction information used in the operation of the driving device.

The correction information 14 is generated by performing each of steps S1 to S5 illustrated in FIG. 4. That is, a driving command calculation step S1 for calculating a driving command that becomes the maximum under a certain frequency is performed; an amplitude value acquisition step S2 for acquiring an amplitude value of the moving element from a value of the driving command and frequency is performed; an insufficient distance calculation step S3 for calculating insufficient distance in accordance with insufficiency of the movable amplitude from the acquired amplitude value of the moving element, a previously set movement possible range and an amount of offset displacement is performed; a correction amount calculation step S4 for calculating a correction amount of the driving command for making the center of reciprocation of the moving element be moved by the insufficient distance is performed; and a storage step S5 for correlating the calculated correction amount and the frequency with each other and storing as the correction information 14 is performed. These steps S1 to S5 are performed as a series of process steps for each frequency to generate the correction information 14. Hereinafter, in the present embodiment, the driving command may be described as a driving current command in which a current is used, but the driving command may be handled as a driving voltage command in which voltage is used.

Figure 5:
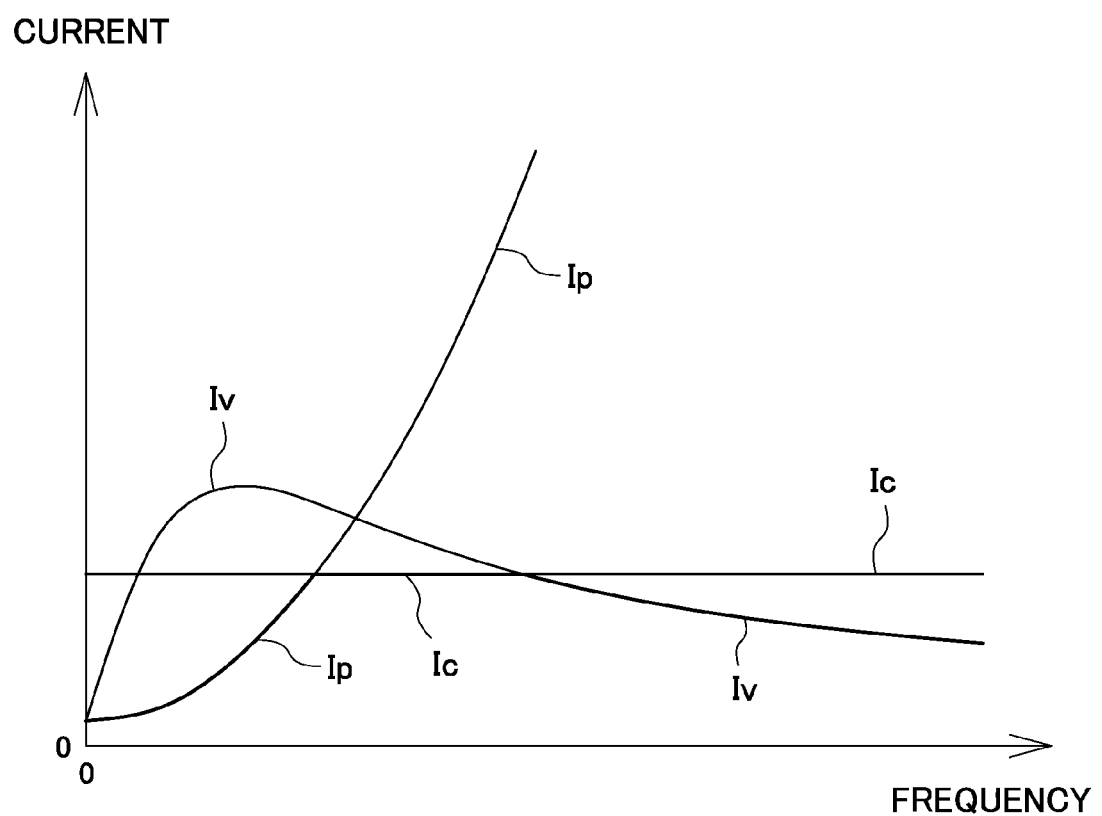
FIG. 5 is a diagram illustrating a relationship between a maximum current value of a driving current command and frequency.

In the driving command calculation step S1 of FIG. 4, the driving command Iref (i.e., the driving current command) which becomes the maximum under a certain frequency is calculated. As the value of the driving current command Iref which becomes the maximum, the smallest value from among a motor maximum current Ic (i.e., the maximum output value), a position maximum current Ip (i.e., collision avoidance), or a voltage maximum current Iv (i.e., voltage saturation prevention) illustrated in FIG. 5 is employed. Note that it is desirable to previously store the maximum driving command information in which a value of the driving command Iref which becomes the maximum under a certain frequency is correlated with each frequency and to configure a function Iref(f) which outputs a value of the driving command when a frequency f is input using this information.

The motor maximum current Ic illustrated in FIG. 5 is either the smaller of the maximum current value which can be output in the control unit 4 (i.e., the controller) illustrated in FIG. 2 which embodies an arithmetic processing function of the present embodiment or the maximum current which can be applied through the linear actuator 20 (i.e., the current strong enough not to demagnetize the magnets) and is constant irrespective of the frequency.

On the other hand, the position maximum current Ip illustrated in FIG. 5 is the upper limit value of the current with which the moving element 23 which operates, when energized with a sinusoidal current, does not move out of the movement possible range D. The position maximum current Ip is represented by the following formula in which a transfer gain from the driving current command Iref to the acceleration generated in the moving element 23 is G(f), an acceptable amplitude value is Lmax (which is half the length of the movement possible range D), the frequency is f, and $\omega=2\pi f$:

Position maximum current $Ip(f)=\omega^2 Lmax/G(f)$ (1)

On the other hand, the voltage maximum current Iv illustrated in FIG. 5 is the upper limit of the current with which voltage saturation, which is a phenomenon that as the frequency becomes large, it becomes difficult to apply a current due to induced voltage of a reciprocal motor, is not caused although the voltage saturation is caused as the frequency becomes large. The voltage maximum current Iv is represented by the following formula in which an impedance of the motor is Z(f), ON resistance of FET is Rfet, the voltage of a power supply (i.e., a battery) is Vbat, an induced voltage constant of the motor is Km, and the mass of the moving element is m:

Voltage maximum current $Iv=Vbat/\{Z(f)+2Rfet+(km^2/m\omega)\}$ (2)

In the amplitude value acquisition step S2 illustrated in FIG. 4, the amplitude value Lp of the moving element 23 is calculated from the value of the driving command Iref (i.e., the driving current command) and the frequency f. That is, formula 7 is acquired from the following formulae (3) to (6) when the motor thrust constant is kt, peak acceleration is Ap, and effective acceleration is a with respect to the driving command Iref(f), and an amplitude value Lp(f) of the moving element is acquired by inputting the frequency f and the driving command Iref(f) into formula (7).

Thrust which can be generated on the motor:

$F(f)=kt \cdot Iref(f)$ (3)

Thrust: $F=ma$ (4)

$a=Ap/\sqrt{2}$ (5)

Amplitude value of moving element: $Lp=Ap/\omega^2$ (6)

Amplitude value of moving element: $Lp(f)=\{\sqrt{2} \cdot kt \cdot Iref(f)\}/m \cdot \omega^2$ (7)

In an insufficient distance calculation step S3 illustrated in FIG. 4, insufficient distance Lc of the moving amplitude ($W_1/2$) is calculated from an amplitude value Lp(f) of the moving element 23, a previously set acceptable amplitude value Lmax (which is half the length of the movement possible range D), and the amount of offset displacement Lm. Amount of offset displacement: Lm=m·g/k Lc=Lmax−Lm−Lp(f) where m represents the mass of the moving element, g represents the gravity acceleration and k represents the spring constant of the actuator. Here, when Lc<0, as illustrated in FIG. 3(b), if the moving amplitude ($W_1/2$) is in a movable area insufficient condition with respect to the amplitude value Lp ($=L_2$) of the moving element 23 which is required for the reciprocation in response to the driving command, that is, if the required amplitude Lp ($=L_2$)>the moving amplitude ($W_1/2$), the insufficient distance is calculated to be |Lc|. On the other hand, when Lc≥0, as illustrated in FIG. 3(a), if the movable amplitude is not in the movable area insufficient condition, i.e., the required amplitude Lp ($=L_1$)<the movable amplitude ($W_1/2$), the insufficient distance Lc is calculated to be zero.

In the correction amount calculation step S4 illustrated in FIG. 4, the correction amount Id of the driving command Iref for making the center of reciprocation Wc of the moving element 23 to be moved by the insufficient distance Lc described above is calculated. The correction amount Id of the driving command Iref is calculated by the following formula.

Correction amount $Id = k \cdot Lc/kt$ where k represents a spring constant of the spring which constitutes the actuator and kt represents the motor thrust constant.

In the storage step S5 illustrated in FIG. 4, as illustrated in FIG. 2, each correction amount Id (for example, $Id_0$ (=0) and $Id_1$ (>0)) acquired above and each frequency f (for example, $f_0$ and $f_1$) are correlated with each other and stored as the correction information 14.

An operation of the linear actuator driving device having the configuration described above will be described. As illustrated in FIG. 3(b), if the movable amplitude is in the movable area insufficient condition at frequency $f_1$, the range required for the reciprocation of the moving element 23 at the amplitude value Lp (=$L_2$) acquired from the two parameters of the frequency $f_1$ acquired in the frequency acquisition unit 12 in FIG. 2 and the driving command Iref which becomes the maximum under the frequency $f_1$ is larger than the movable range $W_1$ of the moving element 23 and the insufficient distance Lc of the movable amplitude ($W_1/2$) determined from the amplitude value Lp (=$L_2$), the movement possible range D and the amount of offset displacement Lm is $Lc_1$ ($Lc_1$>0). Therefore, the correction amount for the correction of the driving command Iref is $Id_1$ ($Id_1$>0). Since the correction information 14 in which the frequency $f_1$ and the correction amount $Id_1$ are correlated with each other is used as illustrated in FIG. 2, the correction amount $Id_1$ is acquired with a simple configuration without providing, for example, a mechanism for calculating the amplitude value Lp and the insufficient distance Lc of the moving element 23 on a real-time basis and a mechanism for determining whether the movable amplitude is in the movable area insufficient condition, the driving command Iref is corrected by adding the correction amount $Id_1$ in the adder 13a and, therefore, offset energization is carried out to make, as illustrated in FIG. 3(b), the center of reciprocation of the moving element 23 be moved upward by the insufficient distance $Lc_1$ from Wc to Wc' and the movable range is extended from $W_1$ to $W_2$ and reciprocation at the amplitude value Lp (=$L_2$) becomes possible.

On the other hand, as illustrated in FIG. 3(a), if the movable amplitude is not in the movable area insufficient condition at frequency $f_0$, the range required for the reciprocation of the moving element 23 at the amplitude value Lp (=$L_1$) acquired from the two parameters of the frequency $f_0$ acquired in the frequency acquisition unit 12 in FIG. 2 and the driving command Iref which becomes the maximum under the frequency $f_0$ is smaller than the movable range $W_1$ of the moving element 23 and the insufficient distance Lc of the movable amplitude ($W_1/2$) determined from the amplitude value Lp (=$L_1$), the movement possible range D and the amount of offset displacement Lm is 0. Therefore, the correction amount for the correction of the driving command Iref is $Id_0$ (=0). Although the correction amount $Id_0$ (=0) is acquired from the correction information 14 and the correction amount $Id_0$ (=0) is added by the adder 13a as illustrated in FIG. 2, since the correction amount $Id_0$ is 0, correction of the driving command is stopped substantially and, thereby, offset energization is also stopped.

As described above, the linear actuator driving device 1 of the present embodiment includes the electromagnetic driving unit 10 which makes the moving element 23 reciprocate by carrying out energization in response to the driving command Iref and the offset correcting unit 11 which corrects the driving command Iref to carry out offset energization to make the center of reciprocation Wc of the moving element 23 be moved in the direction in which deviation between the center of reciprocation Wc of the moving element 23 and the center Dc of the movement possible range D is eliminated in a case in which, in a non-energized state, the moving element 23 is displaced from the center Dc of the predetermined movement possible range D due to self weight and, therefore, the movable range $W_1$ is narrower than the movement possible range D. The offset correcting unit 11 is configured such that the amplitude information corresponding to an amplitude value Lp of the moving element 23 required for reciprocation in response to the driving command Iref is acquired and, with respect to the amplitude value Lp corresponding to the acquired amplitude information, if the movable amplitude ($W_1/2$) is in a movable area insufficient condition, correction of the driving command Iref is performed and, on the other hand, if the movable amplitude is not in the movable area insufficient condition, correction of the driving command Iref is released.

As described above, the amplitude information corresponding to an amplitude value Lp of the moving element 23 required for reciprocation in response to the driving command Iref is acquired and, with respect to the amplitude value Lp corresponding to the acquired amplitude information, if the movable amplitude ($W_1/2$) is in a movable area insufficient condition, the driving command Iref is corrected and offset energization is carried out and, on the other hand, if the movable amplitude is not in the movable area insufficient condition, the correction of the driving command Iref is released and offset energization is stopped. Therefore, it is possible to reduce offset energization compared with a case in which offset energization is carried out constantly irrespective of whether the movable amplitude is in the movable area insufficient condition as in the related art, to achieve power saving, and to improve power efficiency. Further, since the offset displacement is corrected electrically by offset energization, the device size is not increased although those devices in which offset displacement is corrected mechanically are increased in size.

Further, in the present embodiment, since the offset correcting unit 11 is configured to acquire, in the frequency acquisition unit 12, the frequency f related to the reciprocation of the moving element 23 as the amplitude information and to acquire the amplitude value Lp of the moving element 23 from the acquired frequency f and the maximum value which the driving command Iref can take under the frequency f, it is possible to configure that the driving command Iref is uniformly considered to be the maximum and the amplitude value Lp of the moving element 23 is acquired in accordance with the frequency f of a single parameter, whereby the device is simplified. Especially, since the amplitude value Lp becomes small as the frequency becomes large, it is possible to effectively achieve an effect of reducing power consumption at high frequencies.

In addition, in the present embodiment, since the offset correcting unit 11 corrects the driving command Iref such that the center of reciprocation Wc of the moving element 23 is moved by the distance Lc in accordance with the insufficiency of the movable range $W_1$ determined by the amplitude value Lp corresponding to the amplitude information, the previously set movement possible range D and the amount of offset displacement Lm, the offset energization can be reduced to the limit necessary to secure the movable range required for the reciprocation of the moving element 23. Therefore, it is possible to further pursue power saving.

In addition, in the present embodiment, the offset correcting unit 11 previously stores, the correction information 14 in which the correction amount Id by which the center of reciprocation Wc of the moving element 23 is moved by offset energization and the frequency f which is the amplitude information are correlated with each other and corrects the driving command Iref using the correction amount Id related to the frequency f which is the amplitude information in the correction information 14. Therefore, the offset correcting unit 11 described above can be implemented with a simple configuration while omitting, for example, a mechanism for calculating the amplitude value Lp and the insufficient distance Lc of the moving element 23 on a real-time basis and a mechanism for determining whether the movable amplitude is in the movable area insufficient condition, and with reduced manufacturing cost.

Although an embodiment of the present invention has been described, specific configuration of each component is not limited to that of the foregoing embodiment.

Figure 6:
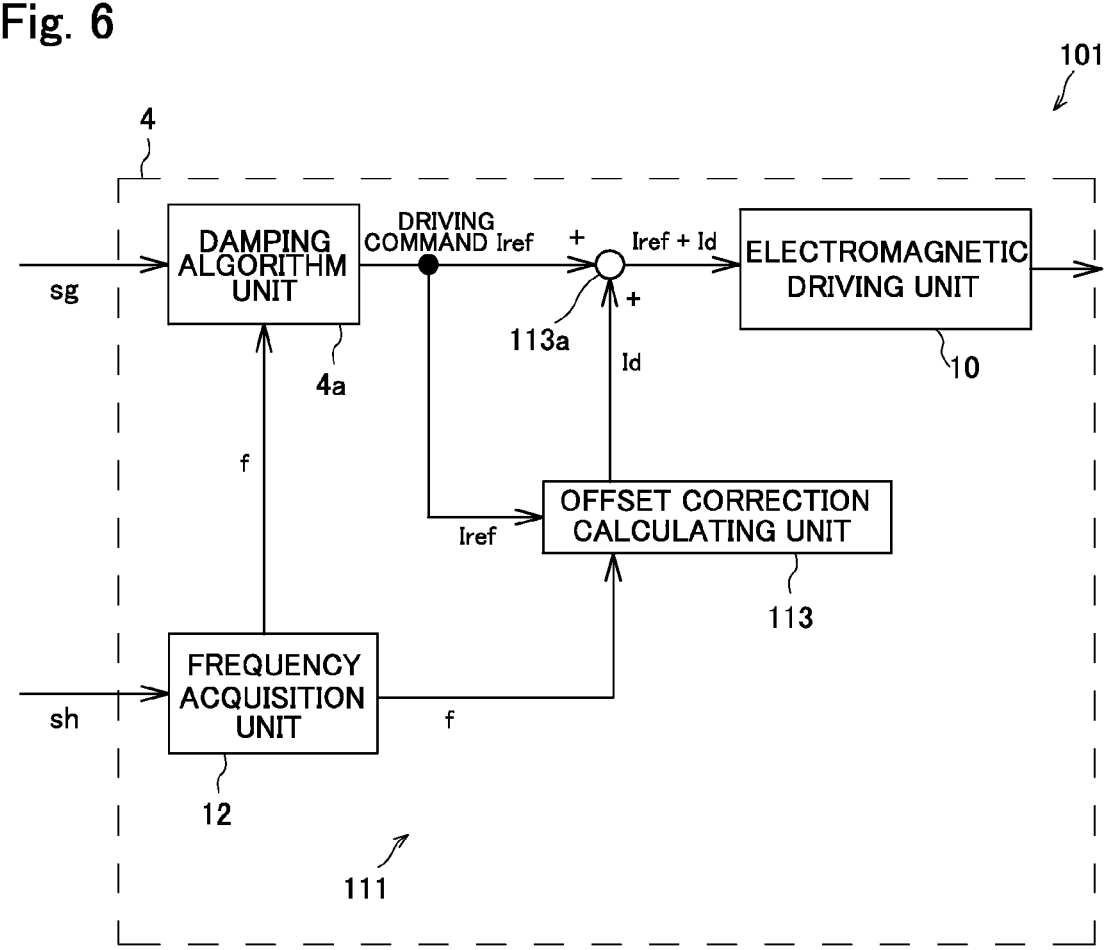
FIG. 6 is a configuration diagram schematically illustrating a configuration and a function of a linear actuator driving device according to another embodiment of the present invention.

For example, although the predetermined correction information 14 is used and a mechanism for calculating an amplitude value Lp, insufficient distance Lc and a correction amount Id which will be required in accordance with the driving command Iref is omitted in the present embodiment, a calculating unit for calculating these may be provided as described below. That is, as illustrated in FIG. 6, an offset correcting unit 111 is configured to include a frequency acquisition unit 12 which is the same in configuration as that described above, and a newly provided offset correction amount calculating unit 113. The offset correction amount calculating unit 113 corrects the driving command Iref by acquiring frequency f related to the reciprocation of the moving element 23 acquired in the frequency acquisition unit 12 as amplitude information, acquiring a driving command Iref produced by a damping algorithm unit 4a as amplitude information, acquiring an amplitude value Lp of the moving element 23 from a value of the acquired frequency f and the driving command Iref through calculation, calculating insufficient distance Lc on the basis of the acquired amplitude value Lp, and adding a correction amount Id in accordance with the insufficient distance Lc in the adder 113a. This calculation is performed using each calculation formula described in the amplitude value acquisition step S2, the insufficient distance calculation step S3 and the correction amount calculation step S4. With such a configuration, since the amplitude value Lp of the moving element 23 is calculated on the basis of the driving command Iref which is actually used in driving the actuator 20, it is possible to carry out highly accurate offset energization using the actual amplitude value of the moving element compared with a case in which an amplitude value of the moving element obtained on the assumption that the driving command is always the maximum as in the present embodiment. Especially, it is possible to effectively achieve an effect of reducing power consumption if the amplitude value of the moving element is small at not only high frequencies but also low frequencies.

Figure 7:
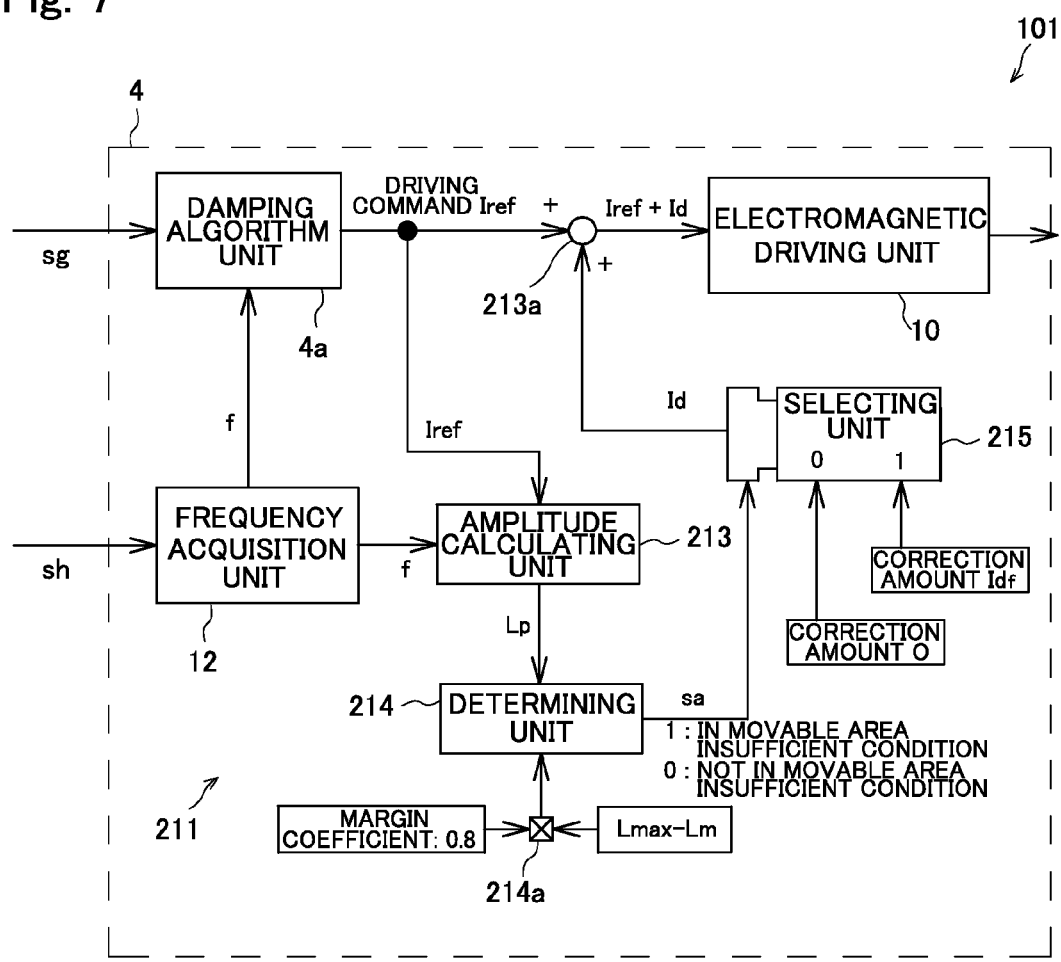
FIG. 7 is a configuration diagram schematically illustrating a configuration and a function of a linear actuator driving device according to an embodiment other than the foregoing embodiments.

An exemplary configuration other than the foregoing configuration is illustrated in FIG. 7. That is, an offset correcting unit 211 is constituted by a frequency acquisition unit 12 which is the same in configuration as that described above, an amplitude calculating unit 213, a determining unit 214 and a selecting unit 215. The amplitude calculating unit 213 acquires frequency f related to reciprocation of the moving element 23 acquired in the frequency acquisition unit 12 as amplitude information, acquires a driving command Iref produced in a damping algorithm unit 4a as amplitude information, and calculates the amplitude value Lp of the moving element 23 using a calculation formula, described in the amplitude value acquisition step S2, from the acquired frequency f and the value of the driving command Iref. The determining unit 214 determines whether the movable amplitude is in a movable area insufficient condition (i.e., in a collision risk condition) on the basis of the amplitude value Lp calculated in the amplitude calculating unit 213 and inputs a determination result signal sa in the selecting unit 215. In particular, the determining unit 214 compares a movable amplitude to which a margin is given by multiplication of a movable amplitude ($W_1/2$) narrowed due to offset displacement (i.e., acceptable amplitude value Lmax−amount of offset displacement Lm) by a margin coefficient 0.8 in a multiplier 214a with the calculated amplitude value Lp and, if the amplitude value Lp is larger, determines that the movable amplitude is in the movable area insufficient condition (i.e., the collision risk condition). The movable amplitude ($W_1/2$) is (acceptable amplitude value Lmax−amount of offset displacement Lm). If the determination result signal sa is 0 (i.e., if the movable amplitude is not in the movable area insufficient condition), the selecting unit 215 sets a correction amount Id to 0. On the other hand, if the determination result signal sa is 1 (if the movable amplitude is in the movable area insufficient condition), the selecting unit 215 corrects the driving command Iref by adding the correction amount Id in the adder 213a with the correction amount Id being a predetermined fixed amount $Id_f$. The predetermined fixed amount $Id_f$ is set such that, for example, the center of reciprocation Wc of the moving element 23 is moved by, for example, an amount of offset displacement Lm. With such a configuration, since the center of reciprocation Wc of the moving element 23 is moved by a certain distance by offset energization, it is possible to secure the movable range reliably with a simple configuration without requiring complicated calculations of the insufficient distance Lc and the correction amount. Further, since the determining unit 214 gives a certain amount of margin to the movable amplitude ($W_1/2$) which is the reference of the determination of whether the movable amplitude is in the movable area insufficient condition, it is possible to improve reliability and safety of the device.

In addition, although the driving command Iref constituted by a current has been exemplified in the embodiment described above, the driving command Iref constituted by voltage is applicable similarly. Further, although an inner type linear actuator has been exemplified in the present embodiment, the present embodiment is applicable also to an outer type linear actuator. Although the linear actuator driving device 1 is applied to the damping system sy as the vibrating means 2 in the present embodiment, the linear actuator driving device 1 is applicable to other devices or systems which drive a linear actuator. Each function unit illustrated in FIGS. 2, 6 and 7 may be implemented by execution of predetermined programs by a processor, or each function unit may be constituted by a dedicated circuit.

It is possible to configure to provide a position detection sensor which detects position of the moving element as amplitude information and acquire the amplitude value of the moving element on the basis of the detection result of the position detection sensor. Examples of the position detection sensor are a shielding sensor and a displacement sensor. With such a configuration, since the position of the moving element is detected directly, it is possible to secure, without requiring complicated calculations, the movable range more reliable and highly accurately.

Various other changes may be made without departing from the spirit and scope of the present invention.

INDUSTRIAL APPLICABILITY

According to the present invention described in detail above, since amplitude information corresponding to the amplitude value of the moving element required for the reciprocation in response to the driving command is acquired and, if the movable amplitude of the moving element with respect to an amplitude value corresponding to the amplitude information is in the movable area insufficient condition, correction of the driving command is performed and offset energization is carried out such that the center of reciprocation of the moving element is moved in the direction in which deviation between the center of reciprocation of the moving element and the center of the movement possible range is eliminated and, on the other hand, if the movable amplitude is not in the movable area insufficient condition, correction of the driving command is released and offset energization is stopped, it is possible to reduce offset energization compared with the case in which offset energization is carried out constantly irrespective of whether the movable amplitude is in the movable area insufficient condition as in the related art, to achieve power saving, and to improve power efficiency. Further, since the offset displacement of the moving element is corrected electrically, the device size is not increased although those devices in which offset displacement is corrected mechanically are increased in size. It is therefore possible to provide a linear actuator driving device suitable for reduction in size and suitable for power saving.

The invention claimed is:

1. A linear actuator driving device, comprising:
an electromagnetic driving unit which makes a moving element reciprocate by carrying out energization in response to a driving command and;
an offset correcting unit which corrects the driving command to carry out offset energization to make the center of reciprocation of the moving element be moved in the direction in which deviation between the center of reciprocation of the moving element and the center of a movement possible range is eliminated in a case in which, in a non-energized state, the moving element is displaced from the center of the predetermined movement possible range due to self weight and, therefore, a movable range is narrower than the movement possible range,
wherein the offset correcting unit acquires amplitude information corresponding to an amplitude value of the moving element required for the reciprocation in response to the driving command and, if a movable amplitude with respect to an amplitude value corresponding to the acquired amplitude information is in a movable area insufficient condition, performs correction of the driving command and, on the other hand, if the movable amplitude is not in the movable area insufficient condition, releases correction of the driving command.

2. The linear actuator driving device according to claim 1, wherein the offset correcting unit is configured to acquire frequency related to reciprocation of the moving element as amplitude information and acquire an amplitude value of the moving element from the acquired frequency and the maximum value which the driving command can take under the frequency.

3. The linear actuator driving device according to claim 1, wherein the offset correcting unit is configured to acquire frequency and the driving command related to reciprocation of the moving element as the amplitude information and acquire an amplitude value of the moving element from the acquired frequency and a value of the driving command.

4. The linear actuator driving device according to claim 1, wherein the offset correcting unit corrects the driving command such that the center of reciprocation of the moving element is moved by insufficient distance of movable amplitude which is determined from an amplitude value corresponding to the amplitude information, a previously set movement possible range and from an amount of offset displacement.

5. The linear actuator driving device according to claim 2, wherein the offset correcting unit corrects the driving command such that the center of reciprocation of the moving element is moved by insufficient distance of movable amplitude which is determined from an amplitude value corresponding to the amplitude information, a previously set movement possible range and from an amount of offset displacement.

6. The linear actuator driving device according to claim 3, wherein the offset correcting unit corrects the driving command such that the center of reciprocation of the moving element is moved by insufficient distance of movable amplitude which is determined from an amplitude value corresponding to the amplitude information, a previously set movement possible range and from an amount of offset displacement.

7. The linear actuator driving device according to claim 1, wherein the offset correcting unit corrects the driving command such that the center of reciprocation of the movable element is moved by certain distance.

8. The linear actuator driving device according to claim 2, wherein the offset correcting unit corrects the driving command such that the center of reciprocation of the movable element is moved by certain distance.

9. The linear actuator driving device according to claim 3, wherein the offset correcting unit corrects the driving command such that the center of reciprocation of the movable element is moved by certain distance.

10. The linear actuator driving device according to claim 1, wherein the offset correcting unit previously stores correction information in which a correction amount by which the center of reciprocation of the moving element is moved by the offset energization and the amplitude information are correlated with each other and corrects the driving command using the correction amount correlated with the amplitude information in the correction information.

11. The linear actuator driving device according to claim 2, wherein the offset correcting unit previously stores correction information in which a correction amount by which the center of reciprocation of the moving element is moved by the offset energization and the amplitude information are correlated with each other and corrects the driving command using the correction amount correlated with the amplitude information in the correction information.

12. The linear actuator driving device according to claim 3, wherein the offset correcting unit previously stores correction information in which a correction amount by which the center of reciprocation of the moving element is moved by the offset energization and the amplitude information are correlated with each other and corrects the driving command using the correction amount correlated with the amplitude information in the correction information.

13. The linear actuator driving device according to claim 4, wherein the offset correcting unit previously stores correction information in which a correction amount by which the center of reciprocation of the moving element is moved by the offset energization and the amplitude information are correlated with each other and corrects the driving command using the correction amount correlated with the amplitude information in the correction information.

14. The linear actuator driving device according to claim 5, wherein the offset correcting unit previously stores correction information in which a correction amount by which the center of reciprocation of the moving element is moved by the offset energization and the amplitude information are correlated with each other and corrects the driving command using the correction amount correlated with the amplitude information in the correction information.

15. The linear actuator driving device according to claim 6, wherein the offset correcting unit previously stores correction information in which a correction amount by which the center of reciprocation of the moving element is moved by the offset energization and the amplitude information are correlated with each other and corrects the driving command using the correction amount correlated with the amplitude information in the correction information.

16. The linear actuator driving device according to claim 7, wherein the offset correcting unit previously stores correction information in which a correction amount by which the center of reciprocation of the moving element is moved by the offset energization and the amplitude information are correlated with each other and corrects the driving command using the correction amount correlated with the amplitude information in the correction information.

17. The linear actuator driving device according to claim 8, wherein the offset correcting unit previously stores correction information in which a correction amount by which the center of reciprocation of the moving element is moved by the offset energization and the amplitude information are correlated with each other and corrects the driving command using the correction amount correlated with the amplitude information in the correction information.

18. The linear actuator driving device according to claim 9, wherein the offset correcting unit previously stores correction information in which a correction amount by which the center of reciprocation of the moving element is moved by the offset energization and the amplitude information are correlated with each other and corrects the driving command using the correction amount correlated with the amplitude information in the correction information.

* * * * *